United States Patent [19]

Swars

[11] Patent Number: 5,000,612
[45] Date of Patent: Mar. 19, 1991

[54] ASSEMBLED DRIVESHAFT

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 315,521

[22] Filed: Feb. 24, 1989

[30] Foreign Application Priority Data

Feb. 24, 1988 [DE] Fed. Rep. of Germany ....... 3805775

[51] Int. Cl.⁵ .............................................. F16B 2/00
[52] U.S. Cl. ........................................ 403/282; 403/1; 403/287; 403/309; 403/341
[58] Field of Search ............... 403/300, 305, 308, 309, 403/313, 341, 287, 24, 282, 1; 29/523, 156.4 R, 520, 507; 285/382; 74/431–434

[56] References Cited

U.S. PATENT DOCUMENTS

| 1,678,582 | 7/1928 | Allen | 74/410 |
| 3,674,292 | 7/1972 | Demler, Sr. | 29/507 X |
| 4,382,390 | 5/1983 | Jordan | 74/567 |
| 4,750,250 | 6/1988 | Maus et al. | 29/156.4 R |

FOREIGN PATENT DOCUMENTS

| 0309899 | 4/1989 | European Pat. Off. | |
| 924666 | 11/1952 | Fed. Rep. of Germany. | |
| 3425600 | 7/1984 | Fed. Rep. of Germany. | |
| 3803684 | 2/1988 | Fed. Rep. of Germany. | |
| 8713285 | 2/1988 | Fed. Rep. of Germany. | |
| 744131 | 4/1933 | France. | |
| 09614 | 4/1923 | Switzerland. | |
| 15675 | of 1900 | United Kingdom | 74/431 |

OTHER PUBLICATIONS

"Brosszahnrad aus Stahlguss", Buchmann, Industrie Anzeiger, pp. 1602–1603, Nov. 12, 1977.

Primary Examiner—Andrew V. Kundrat
Assistant Examiner—Franco S. DeLiGuori
Attorney, Agent, or Firm—Toren, McGeady & Associates

[57] ABSTRACT

The invention relates to an assembled driveshaft in the case of which individual driving elements, especially gears, are non-rotatingly connected to a hollow shaft, with the connection between the hollow shaft and the driving elements essentially being achieved by a force or friction locking connection between the plastically expanded hollow shaft and the elastically pretensioned driving elements. For improving the bending and torsional stiffness of the driveshaft, at least one driving element has been produced to comprise at least two toothed discs with different diameters connected to each other by a sleeve, with the sleeve either being positioned directly on the shaft to form a basis for the connection or radially spaced from the shaft between the discs.

13 Claims, 2 Drawing Sheets

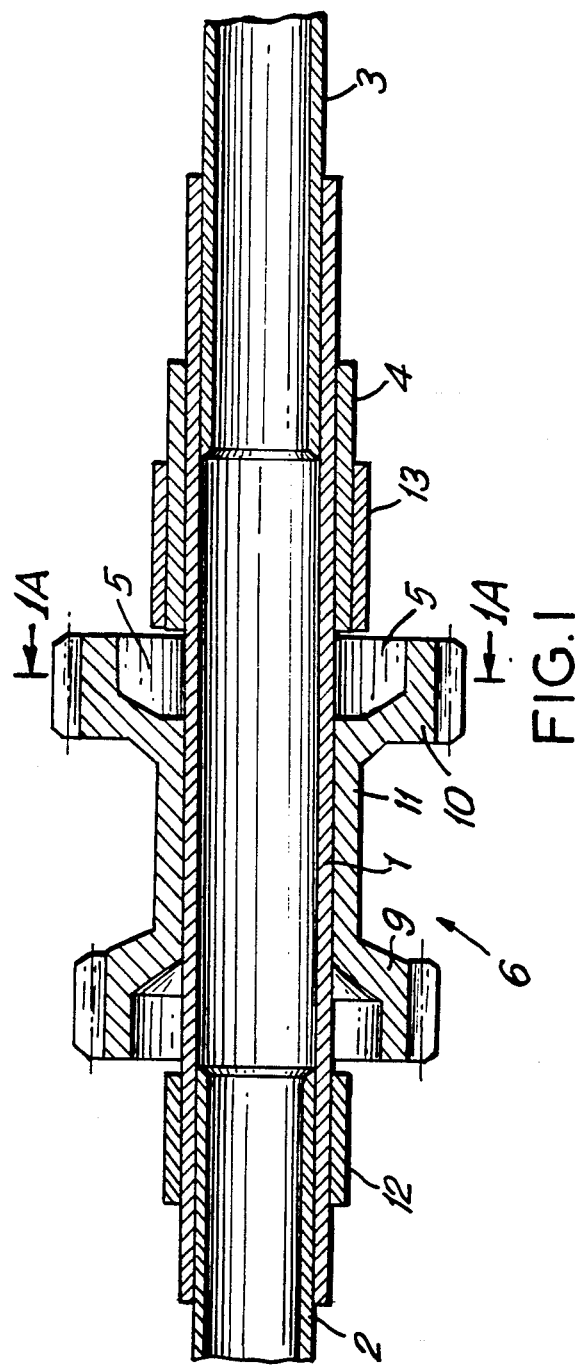
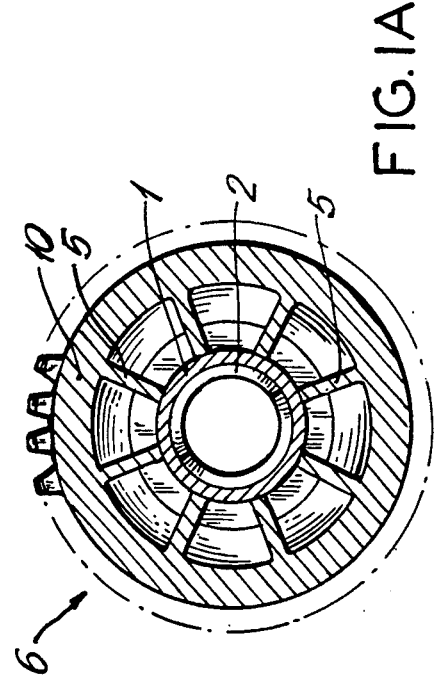

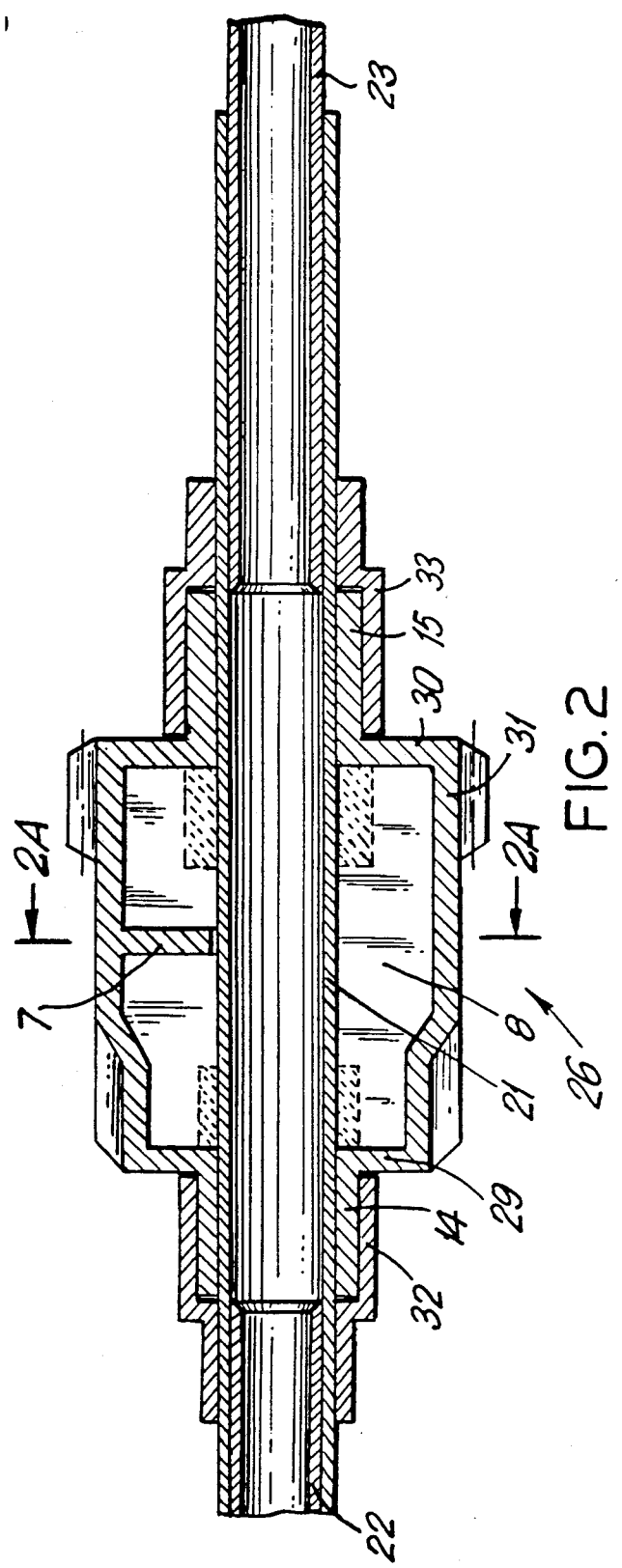
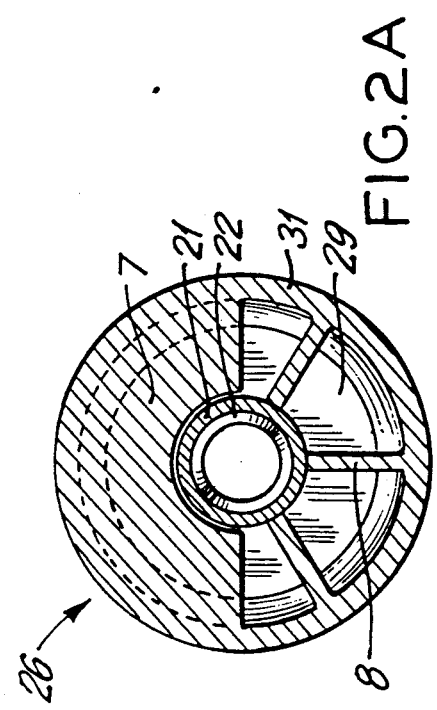

ASSEMBLED DRIVESHAFT

BACKGROUND OF THE INVENTION

The invention relates to an assembled driveshaft in the case of which individual driving elements, especially gears, are non-rotatingly attached to a hollow shaft, with the connection between the hollow shaft and the driving elements essentially being achieved by force or friction locking between the plastically expanded hollow shaft and the elastically pretensioned driving element.

An assembled driveshaft in which a hollow shaft is expanded in a die in such a way that due to a polygonous cross-section of the hollow shaft, a form-fitting engagement occurs in the region of the gears, is known from DE 34 25 600. Assembled driveshafts where the connection between the hollow shaft and the driving elements is essentially achieved by friction locking between the plastically expanded hollow shaft and the elastically pretensioned driving elements are described in DE 38 03 684. Such shafts, especially, are composed of individual sleeves and tubular portions.

SUMMARY OF THE INVENTION

It is an object of the present invention to increase the bending stiffness of shafts of the above type while at the same time simplifying their production process. The objective is achieved in that at least one driving element is produced to be integral with at least two toothed discs having different diameters and connected to each other via a sleeve. The production-technical advantages of such a design being that the total number of components is reduced in that for example two gears may be produced as one single relatively uncomplicated casting and connected to the shaft jointly. These advantages in respect of shaft strength are the result of the double wall of the shaft in accordance with the invention, which considerably increased both the bending strength and the torsional strength of the shaft. Those gear rings located in the region of highest bending and/or torsional loads on the shaft are preferably combined to form one driving element connected by a sleeve. It is particularly advantageous to combine those gears positioned in the region of direct force flow across the shaft.

A first advantageous embodiment of the invention is characterized in that between the toothed discs, of which there are at least two, there is provided a sleeve adjoining their hubs and attached to the hollow shaft via a friction locking connection. This achieves a further production-technical advantage in that by expanding one single continuous axial region of the hollow shaft it is possible to simultaneously attach several driving elements, i.e. preferably two gears, while using one simply designed probe with one single sealing region. Depending on the material selected, most of the bending and torsional forces acting on the shaft may be accommodated by the sleeve connecting the toothed discs.

In a second advantageous embodiment it is proposed that between the toothed discs, of which there are at least two, there is provided a sleeve starting in the vicinity of the teeth and being at a radial distance from the hollow shaft. In this case, the friction locking connection of the driving element has to be produced in the region of the hubs of the toothed discs or in their direct vicinity, with two individual portions of the hollow shaft having to be plastically expanded in the axial direction. As a result of the considerably larger diameter of the sleeve connecting the toothed discs, bending strength and torsional strength are again increased considerably, with possibly less material being used. To increase the strength of the shaft further, longitudinally extending reinforcing ribs whose cross-section extends radially relative to the shaft axis may be drawn in between the toothed discs.

To achieve a friction locking connection between the driving elements and the hollow shaft as described with reference to the latter embodiment, it is possible to associate the toothed discs with symmetrical sleeve attachments or sleeve attachments unilaterally extending inwardly or outwardly, with the inwardly extending sleeve advantageously shortening the component length. By using outwardly extending sleeve attachments it is possible to increase the strength of the connection with the hollow shaft in that on the outside further tubular pieces are slid on which, following the plastic deformation of the hollow shaft, remain elastically pretensioned relative to the sleeve attachments. This achieves a radial clamping-in effect which is particularly advantageous if the driving element with the two toothed discs is made of a less elastic material, i.e. a cast material, with malleable cast iron, especially GTS 65 being particularly suitable.

The tubular pieces slid on to the sleeve attachments of the driving elements may extend so as to be axially stepped and additionally, they may enter a direct friction locking connection with a basic tube of the hollow shaft. Their outer surface may serve as a running face for roller bearings, one reason in favor of this solution being that the material for these tubular pieces in any case has to have a higher yield point than that of the hollow shaft and the driving elements. A bearing material such as 100 CR 6 is particularly suitable whereas the material for the continuous hollow shaft may be ST 35, for example.

Two preferred embodiments are illustrated in the attached drawings and described below.

BRIEF DESCRIPTION OF THE DRAWING

FIG. 1 shows a shaft in accordance with the invention, having a driving element adjoining the hubs of toothed discs;

FIG. 1A is a cross-section along the line 1A—1A of the shaft of FIG. 1;

FIG. 2 shows a shaft in accordance with the invention, having a driving element with a sleeve starting in the vicinity of the teeth; and FIG. 2A is a cross-section along the line 2A—2A of the shaft of FIG. 2.

DETAILED DESCRIPTION OF THE PREFERRED EMBODIMENT

FIG. 1 illustrates a driveshaft comprised of a hollow shaft 1. At its ends there have been inserted tubular pieces 2, 3 with a tubular piece 4 having been slid on to cover the latter. A driving element 6 has been slid on to the hollow shaft formed in this way and attached in a force or friction locking way through internal plastic deformation of the hollow shaft. The driving element 6 consists of two toothed discs 9, 10 connected to each other by a sleeve 11 which adjoins their hubs. The sleeve 11 being directly located on the hollow shaft 1. Circumferentially distributed reinforcing ribs 5 are indicated by way of example on the toothed disc 10. Furthermore, tubular pieces 12, 13 have been slid on to the tubular shaft 1. These pieces 12, 13 consist of a bearing material and serve as a track for a roller bearing. The tubular piece 4 being inserted into the latter and clamping in the end of the tubular shaft 1 together with the tubular piece 3.

FIG. 2 shows an essentially continuous hollow shaft 21, with tubular pieces 22, 23 having been inserted at the ends. A driving element comprising two toothed discs, 29, 30 connected via a sleeve 31 radially spaced from hollow shaft 21 and starting in the vicinity of the teeth has been slid on to the hollow shaft 21. In the region of the hubs, the toothed discs are followed by axially outwardly extending sleeve attachments 14, 15 which directly produce the force and friction locking connection with the hollow shaft 21. The sleeve attachments can also be axially inwardly extending as shown by dashed lines in FIG. 2. The upper half of the figure shows a circumferentially extending annular reinforcing rib 7 and as an alternative, the lower half of the figure illustrates circumferentially distributed longitudinally extending reinforcing ribs 8. Tubular pieces 32, 33 made of a bearing material are slid on to the sleeve attachments 14, 15 and continue in a stepped way and in the region following the sleeve attachments they are in direct friction locking contact with the hollow shaft 21.

While the invention has been illustrated and described as embodied in an assembled crankshaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An assembled driveshaft, comprising:
a plastically expandable hollow shaft; and
elastically pretensioned individual driving elements non-rotatingly attached to said hollow shaft, the connection between said hollow shaft and said driving elements being achieved by force or friction locking between said plastically expanded hollow shaft and said elastically pretensioned driving elements, at least one driving element comprising at least two toothed discs connected to each other by a sleeve which is radially spaced from the hollow shaft.

2. An assembled driveshaft according to claim 1, and further comprising sleeve attachments adjoining the toothed discs on both sides, the sleeve attachments being provided so as to participate in the friction-locking connection of the driving elements with the hollow shaft.

3. An assembled driveshaft according to claim 2, wherein the sleeve attachments adjoin the toothed discs so as to extend axially outwardly.

4. An assembled driveshaft according to claim 2, wherein the sleeve attachments adjoin the toothed discs so as to extend axially inwardly.

5. An assembled driveshaft according to claim 1, and further comprising circumferential ribs between the toothed discs and within the sleeve starting in the vicinity of the disc teeth.

6. An assembled driveshaft according to claim 1, and further comprising longitudinally extending ribs between the toothed discs and within the sleeve starting in the vicinity of the disc teeth.

7. An assembled driveshaft according to claim 1, wherein the hollow shaft is made up of several tubular pieces and/or sleeves which are inserted into each other and which, in the region of their radial overlap, are at least partially connected to each other.

8. An assembled driveshaft according to claim 2, and further comprising tubular pieces slid on to the sleeve attachments, the tubular pieces being elastically pretensioned relative to the sleeve attachments following plastic deformation of the hollow shaft.

9. An assembled driveshaft according to claim 8, wherein the tubular pieces are provided so as to serve as inner bearing races of roller bearings.

10. An assembled driveshaft according to claim 1, wherein the at least one driving element with at least two toothed discs is of a cast material.

11. An assembled driveshaft according to claim 7, wherein the tubular pieces are of a material having a higher yield point than the part of the hollow shaft positioned radially inwardly relative to them.

12. An assembled driveshaft according to claim 1, wherein said at least two toothed discs have different diameters.

13. An assembled driveshaft according to claim 1, wherein said sleeve starts in the vicinity of the disc teeth.

* * * * *